US012755206B2

(12) United States Patent
Shin et al.

(10) Patent No.: US 12,755,206 B2
(45) Date of Patent: Oct. 6, 2026

(54) METHOD OF ANALYZING SOCIAL INFLUENCE BETWEEN INTERNET FORUMS AND APPARATUS FOR THE SAME

(71) Applicants: Korea Advanced Institute of Science and Technology, Daejeon (KR); S2W INC., Seongnam-si (KR)

(72) Inventors: Seung Won Shin, Daejeon (KR); Kwan Woo Kim, Daejeon (KR); Young Jin Jin, Daejeon (KR); Chang Hoon Yoon, Seongnam-si (KR)

(73) Assignees: Korea Advanced Institute of Science and Technology, Daejeon (KR); S2W INC., Seongnam-si (KR)

( * ) Notice: Subject to any disclaimer, the term of this patent is extended or adjusted under 35 U.S.C. 154(b) by 496 days.

(21) Appl. No.: 18/538,008

(22) Filed: Dec. 13, 2023

(65) Prior Publication Data

US 2024/0202839 A1 Jun. 20, 2024

(30) Foreign Application Priority Data

Dec. 15, 2022 (KR) ........................ 10-2022-0175636

(51) Int. Cl.
*G06N 20/00* (2019.01)
*G06Q 10/46* (2026.01)

(52) U.S. Cl.
CPC ............. *G06N 20/00* (2019.01); *G06Q 10/46* (2026.01)

(58) Field of Classification Search
CPC ............................... G06N 20/00; G06Q 10/46
See application file for complete search history.

(56) References Cited

U.S. PATENT DOCUMENTS

| | | | | |
|---|---|---|---|---|
| 9,684,868 | B2 * | 6/2017 | Lawrence | G06N 20/00 |
| 2024/0005413 | A1 * | 1/2024 | Tayeb | G06N 3/045 |
| 2025/0045561 | A1 * | 2/2025 | Grazioli | G06N 3/045 |

FOREIGN PATENT DOCUMENTS

| | | |
|---|---|---|
| KR | 10-2018-0099812 A | 9/2018 |

OTHER PUBLICATIONS

Gao, Liqun, et al. "HetInf: social influence prediction with heterogeneous graph neural network." Frontiers in Physics 9 (2022): 787185. (Year: 2022).*

Kim, Seungbae, and Jinyoung Han. "Detecting engagement bots on social influencer marketing." International Conference on Social Informatics. Cham: Springer International Publishing, 2020. (Year: 2020).*

Kim, Seungbae, Jyun-Yu Jiang, and Wei Wang. "Discovering undisclosed paid partnership on social media via aspect-attentive sponsored post learning." Proceedings of the 14th ACM international conference on web search and data mining. 2021. (Year: 2021).*

(Continued)

*Primary Examiner* — Hal Schnee
(74) *Attorney, Agent, or Firm* — USX IP LLC

(57) ABSTRACT

Provided is a method of analyzing social influence. The method according to the embodiments includes obtaining posts containing text data in a forum, generating a forum interaction graph including a plurality of nodes corresponding to a plurality of embedded vectors generated by embedding the posts and edges indicating a connection relationship between the posts, and training an artificial intelligence model using the forum interaction graph.

11 Claims, 9 Drawing Sheets

(56) References Cited

OTHER PUBLICATIONS

Song, Zheng, et al. "Spammer detection using graph-level classification model of graph neural network." 2021 IEEE 2nd International Conference on Big Data, Artificial Intelligence and Internet of Things Engineering (ICBAIE). IEEE, 2021. (Year: 2021).*

Li, Yangyang, et al. "Relevance-aware anomalous users detection in social network via graph neural network." 2021 international joint conference on neural networks (IJCNN). IEEE, 2021. (Year: 2021).*

Jeong Yi-Tae, et al. "Research on detecting COVID-19 fake news using graph embedding—Comparison of detection performance depending on use of social participation network*", Journal Intel. Information System, Mar. 2022, vol. 28, No. 1 pp. 197-216 (40 pages).

Fei Yang, et al. "Semi-supervised classification via full-graph attention neural networks", Neurocomputing, 2022, vol. 476, pp. 63-74 (12 pages).

Korean Office Action dated Nov. 27, 2023 in Application No. 10-2022-0175636.

* cited by examiner (A)

| Features | *TheHub* | *BitcoinTalk* |
|---|---|---|
| # of Posts | 24,227 | 650,681 |
| # of Links | 43,865 | 1,449,625 |
| # of Users | 3,565 | 50,794 |

(B)

| | | GNN Layer | | | | |
|---|---|---|---|---|---|---|
| Dataset | k | GCN | GAT | GATv2 | UAGAT | UA+v2 |
| *TheHub* | 2 | 54.94 | 54.79 | 61.93 | 55.35 | **62.02** |
| | 3 | 54.57 | 54.48 | 62.20 | 55.28 | **62.22** |
| | 4 | 54.19 | 54.48 | 61.55 | 54.99 | **61.62** |
| | 5 | 53.63 | 54.02 | 61.07 | 54.90 | **61.08** |
| *BitcoinTalk* | 2 | 56.51 | 57.35 | 63.93 | 58.66 | **64.09** |
| | 3 | 55.62 | 56.53 | 63.93 | 57.72 | **63.97** |
| | 4 | 55.03 | 55.40 | **64.04** | 57.31 | 63.85 |
| | 5 | 54.61 | 55.23 | **64.12** | 57.52 | 63.84 |

(C)

| Rank | PageRank | Influencer | | Spammer | |
|---|---|---|---|---|---|
| | | TOI | # of posts | SI/P | TSI |
| #1 | ID-30 | ID-221 | ID-30 | ID-573 | ID-573 |
| #2 | ID-45 | ID-45 | ID-45 | ID-259 | ID-221 |
| #3 | ID-221 | ID-681 | ID-221 | ID-2559 | ID-30 |
| #4 | ID-17 | ID-30 | ID-17 | ID-363 | ID-45 |
| #5 | ID-20 | ID-20 | ID-20 | ID-2011 | ID-666 |
| #6 | ID-468 | ID-1791 | ID-415 | ID-1523 | ID-996 |
| #7 | ID-73 | ID-996 | ID-468 | ID-1875 | ID-681 |
| #8 | ID-996 | ID-960 | ID-996 | ID-2985 | ID-503 |
| #9 | ID-415 | ID-235 | ID-271 | ID-2757 | ID-235 |
| #10 | ID-271 | ID-394 | ID-73 | ID-391 | ID-20 |

FIG. 6

(A)

Poster: [User #221]
Post article: *hunt cocaine decided try S********r special deal.*
...
*throughout show throughout night. I definitely order S********r far best cocaine tried.Order Confidence*

Poster: [User #259]
Post article: *Welcome!Here is your w*****p online.*
...
*Then we gonna reship you minimal 50%(depends how much orders and your feed-back)But always wait at least 10 working days.Thank you.*

(B)

name: [User #221]
postgroup: Legendary
membergroup: ' '
postcount: 2000
karma: +308/-64 name: [User #573]
postgroup: Full
membergroup: 'Vendor'
postcount: 160
karma: +1/-13

FIG. 7

METHOD OF ANALYZING SOCIAL INFLUENCE BETWEEN INTERNET FORUMS AND APPARATUS FOR THE SAME

CROSS-REFERENCE TO RELATED APPLICATION

This application claims priority to and the benefit of Korean Patent Application No. 2022-0175636, filed on Dec. 15, 2022, the disclosure of which is incorporated herein by reference in its entirety.

BACKGROUND

1. Field of the Invention

The present disclosure relates to a method of analyzing social influence between Internet forums and an apparatus for the same.

2. Discussion of Related Art

With the rapid development of social network services, communication through online media has become an unavoidable part of our daily lives. Accordingly, social influence online is cited as the most powerful source influencing people's behavior. Therefore, understanding the phenomenon of propagation of social influence online can be helpful in solving many social problems that may occur in reality by analyzing online communities (or forums) and the like, and thus the need for the understanding of such a phenomenon is emerging. For example, using research on the understanding of such a phenomenon, it is possible to track the social influence of behavior in clandestine communities online and the like so that investigators can identify socially threatening or illegal behavior. In addition, marketers will be able to determine an advertising model by recognizing the flow of social influence online.

Conventionally, analysis of influence between users on the Internet has been performed by analyzing patterns in which specific information spreads on social networks. Examples of the specific information that has been used for the analysis of the influence include specific topics or news and the like. In the past, the analysis of the influence was performed through a statistical test in an A/B testing method, but with the recent development of deep learning techniques, methods of analyzing influence among users on the Internet using deep learning have also been proposed.

Meanwhile, these conventional techniques have a problem in that general influence between users or between specific actions of users cannot be measured. In the conventional techniques, since the analysis was performed depending only on determined characteristics (e.g., purchase of a product, use of similar words, etc.) of an object to be analyzed, only effects related to the characteristics could be statistically measured. However, the conventional method described above is not suitable for analyzing social influence occurring in online forums (e.g., dark-web forums). The conventional influence analysis was often conducted because of interest in the characteristics themselves determined for the purpose of product marketing, etc. However, since the social influence of online forums can only be inferred when an understanding of the forums themselves is supposed, the conventional analysis method that relies only on determined characteristics of an object to be analyzed is not a good method.

As a related art, Korean Laid-open Patent Publication No. 10-2008-0003681 is disclosed.

SUMMARY OF THE INVENTION

The present disclosure is directed to providing a method of analyzing social influence between Internet forums and an apparatus for the same.

According to an aspect of the present disclosure, there is provided a method of analyzing social influence, which includes obtaining posts containing text data in a forum, generating a forum interaction graph including a plurality of nodes corresponding to a plurality of embedded vectors generated by embedding the posts and edges indicating a connection relationship between the posts, and/or training an artificial intelligence model using the forum interaction graph, wherein the artificial intelligence model includes a graph neural network model that inputs a first embedded vector generated by embedding a first post corresponding to a first node to predict a second embedded vector generated by embedding a second post corresponding to a second node connected to the first node through an edge.

The plurality of embedded vectors may be data in which the text data within the posts is embedded based on a model, Bidirectional Encoder Representations from Transformers (BERT). The plurality of embedded vectors may be data in which the text data within the posts is embedded based on term frequency-inverse document frequency (TF-IDF) values.

In the training of the artificial intelligence model, one or more attention coefficients may be updated based on the first embedded vector and the second embedded vector.

The artificial intelligence model may include one or more layers including the one or more attention coefficient, and in the training of the artificial intelligence model, the one or more attention coefficients may be updated by receiving the first embedded vector to perform forward propagation on the first embedded vector, and performing backward propagation on the first embedded vector using the second embedded vector and a result derived from the forward propagation.

The method of analyzing the social influence may further include identifying a spammer or an influencer from among writers of the posts on the basis of the trained artificial intelligence model.

In the identifying of the spammer or the influencer, the spammer or the influencer may be identified using user-to-user influence information that is calculated based on a first matrix representing the posts and user information of each post and a second matrix derived based on the one or more attention coefficients. Here, the second matrix may be generated by propagating the one or more attention coefficients to the forum interaction graph using a random walk with restart method.

The spammer may be derived based on one or more self-flow influence values indicating influence between the posts written by each writer from among values included in the user-to-user influence information. The influencer may be derived based on at least one out-flow influence value indicating influence of one or more posts written after a first writer's post among the values included in the user-to-user influence information.

BRIEF DESCRIPTION OF THE DRAWINGS

The above and other aspects of the present disclosure will become more apparent to those of ordinary skill in the art by describing exemplary embodiments thereof in detail with reference to the accompanying drawings, in which:

FIGS. 6 to 8 are diagrams showing results of identifying spammers and influencers using a trained artificial intelligence model, and performance thereof.

DETAILED DESCRIPTION OF EXEMPLARY EMBODIMENTS

Figure 1:
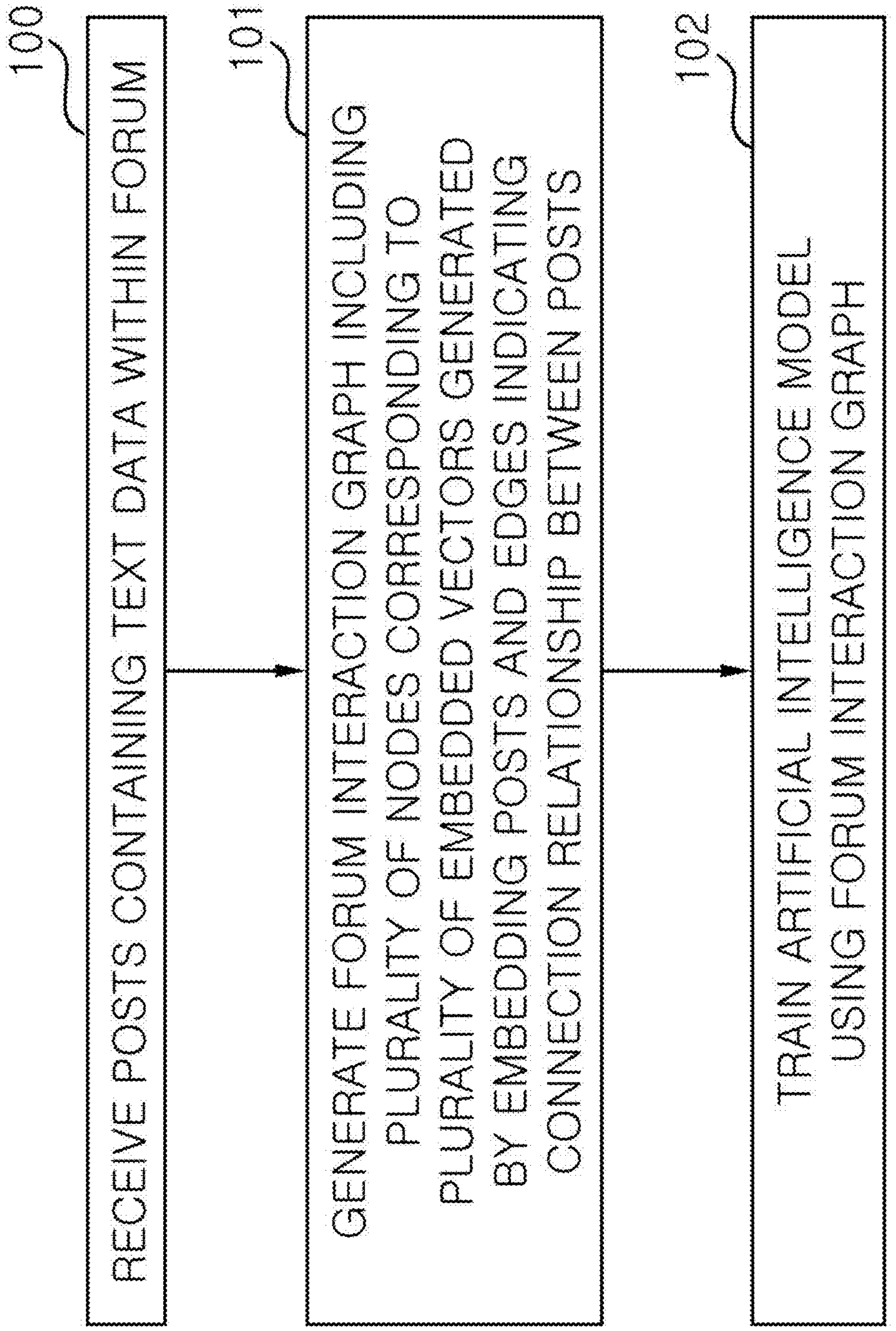
FIG. 1 shows an example of a method of training an artificial intelligence model for analyzing social influence between Internet forums according to embodiments.

While the present disclosure is open to various modifications and alternative forms, specific embodiments thereof are shown by way of example in the drawings and will be described herein in detail. However, it should be understood that there is no intent to limit the present disclosure to the particular forms disclosed, and on the contrary, the present disclosure is to cover all modifications, equivalents, and alternatives falling within the spirit and scope of the present disclosure. Like numbers refer to like elements throughout the description of the drawings.

It will be understood that, although the terms "first," "second," "A," and "B" etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting to the present disclosure. As used herein, the singular forms "a" and "an" are intended to also include the plural forms, unless the context clearly indicates otherwise. It should be further understood that the terms "comprise," "comprising," "include," and/or "including," when used herein, specify the presence of stated features, integers, steps, operations, elements, parts, or combinations thereof, but do not preclude the presence or addition of one or more other features, integers, steps, operations, elements, parts, or combinations thereof.

Unless otherwise defined, all terms including technical and scientific terms used herein have the same meaning as commonly understood by one of ordinary skill in the art to which this invention belongs. It should be further understood that terms, such as those defined in commonly used dictionaries, should be interpreted as having a meaning that is consistent with their meaning in the context of the relevant art and are not to be interpreted in an idealized or overly formal sense unless expressly so defined herein.

With the rapid development of social network services, communication through online media has become an unavoidable part of our daily lives. Accordingly, social influence online is cited as the most powerful source influencing people's behavior. Therefore, understanding the phenomenon of propagation of social influence online can be helpful in solving many social problems that may occur in reality by analyzing online communities (or forums) and the like, and thus the need for the understanding of such a phenomenon is emerging.

Meanwhile, unlike other social network services, on Internet forums, due to the random and excessive nature of users meeting and interacting with each other, social influence analysis is even more important. A key challenge in understanding social influence in Internet forums is to quantitatively measure influence between two forum posts. Therefore, in the present disclosure and specification, a new problem called "social influence association estimation" is defined in order to identify a matrix including information on influential association ratios between a plurality of posts. Each element of the matrix described above includes information indicating influential correlation ratios between a target post and other posts. In addition, in the present disclosure and specification, a new self-supervised framework that can be called a mirror network is proposed.

A mirror network according to the embodiments learns influence of target posts on an ego network using a user-aware graph attention network (UAGAT) mechanism proposed in this specification.

In order to verify the present disclosure, data sets collected from online communities of dark webs and surface webs were used as training data or experimental data, and the performance of the proposed mirror network was evaluated. Further, the present disclosure demonstrates its ability to conduct qualitative research such as identifying spammers and influencers in a wide range of investigations that can be performed in a wide range.

Specifically, the related art of the present disclosure is introduced as follows. Social influence is a concept that can explain the participation of different individuals who are living in the same social environment in social media. With the spread of social media, people are now able to actively communicate with each other, and can influence others in various fields. In fact, social influence affects various levels of human life, from human physical behavior to political opinions. In particular, social influence affects how people think and how they make decisions. Due to such practical power, social influence has become an essential concept that should be understood in fields including advertising, marketing, and the like.

Due to the great interest in social influence, researchers have attempted to observe and estimate phenomena generated by social influence online in various ways. Chang has conducted research on predicting an information cascade phenomenon by applying a recurrent neural network (RNN)

to a node sequence sampled with a random walk method/strategy. In addition, Qiu studied a model for predicting user-level social influence called Deepinf using a graph representation learning method. In the above-described studies, it can be said that research focuses on modeling user behavior, such as social behavior, in a given social context or estimating a user's influence on a specific topic in a citation network.

In the conventional studies, social influence on various social platforms (e.g., Twitter, Flicker, etc.) was measured, but there was a limitation in that Internet forums were not used as media for mining social influence. Internet forums differ from other social platform services in that the Internet forums do not provide a social network in which "friends" are clearly determined or defined, and social encounters occur randomly and frequently. For example, users on Internet forums may be influenced by random users as well as preset friends. Since measuring social influence on Internet forums is more diverse and difficult to predict, analyzing social behaviors from the social influence may be useful research or knowledge. Until now, research on Internet forums has focused only on uncovering abnormal behavior in Internet forums, such as cyberbullying and political propaganda, instead of digging into fundamental analysis. However, analysis apparatuses according to this specification and embodiments focus on considering and measuring issues related to social influence, which are aimed at finding the size of influence that a specific post has in a social environment such as an Internet forum.

The analysis apparatus according to the embodiments may solve many issues, including finding posts that have influence in academia, industry, etc., disclosing influential people, or tracking spammers in Internet forums, by utilizing the above-described analysis.

In order to estimate social influence and its association in Internet forums, in this specification, a method of evaluating and analyzing social influence using a graph attention network, which is a self-supervised attention-based network called a mirror network, is proposed. In a mirror network according to embodiments, a model, Bidirectional Encoder Representations from Transformers (BERT), which is an artificial intelligence model that is already formed by learning data expressed in text, may be used so that data in which text of posts in forums is embedded may be used. Embedding may be fed to a self-supervised network that predicts an original embedded vector from adjacent embedded vectors and a graph structure. In the mirror network, a graph attention mechanism that distinguishes influence of past neighbor posts on future posts may be used. A UAGAT that is newly proposed to solve an inherent order-invariance problem of a graph attention network is proposed.

In order to prove the performance of the present disclosure, two real Internet forum data sets collected from dark webs and surface webs were constructed and tested. In order to verify the performance of the above-described UAGAT according to the embodiments, the accuracy of a mirror network for verifying original forum posts among negative samples was measured. Further, in this specification, a utilization method is proposed in which spammers and influencers in forums are identified using a random walk with restart (RWR) algorithm that propagates nearest neighbor influence to estimate the influence on the entire graph.

In summary, in this specification, 1) a problem of investigating and predicting social influence association on Internet forums is introduced, 2) a new graph attention layer that solves an inherent order-invariance problem, that is, the UAGAT according to the embodiments, and a mirror network, which is a self-supervised attention-based network that explores and analyzes social influence association, are provided, and 3) performance of the above-described model is verified using actual forum data, and two realistic utilization examples are provided in which the model according to the embodiments is applied.

Hereinafter, exemplary embodiments of the present disclosure will be described in detail with reference to the accompanying drawings.

A method of analyzing social influence between Internet forums according to embodiments includes 1) training an artificial intelligence model for analyzing the social influence between the Internet forums according to the embodiments, and 2) applying or providing the trained artificial intelligence model to utilization apparatuses.

First, in FIGS. 1 to 3, the content related to the training of the artificial intelligence model for analyzing the social influence between the Internet forums according to the embodiments will be described, in FIG. 4, utilization examples of the utilization apparatuses using the trained artificial intelligence model will be described, in FIGS. 5 to 9, analysis results of the performance of the artificial intelligence model and the utilization examples will be verified, and in FIG. 10, an implementation example of the present disclosure will be described.

Meanwhile, notations used in this specification and their meanings may be as defined in Table 1 below, which may be referred to in the following description of the invention.

TABLE 1

| Notations | Meanings |
|---|---|
| F | An Internet forum |
| a a | A post in an Internet forum |
| $G_F$ $G_F$ | A forum interaction graph of a social network (forum) F |
| V | A set of posts that are node(s) of $G_F$ |
| E | A set of connection relationships between posts that are edge(s) of $G_F$ |
| SIA( ) | A social influence association function |
| σ(•) | An activation function |
| α | An attention coefficient |
| W | A learnable weight matrix |
| a | A learnable weight vector |
| H | An embedded vector for a post |
| k | A depth of graph neural network (GNN) layers |
| $A^k$ | A matrix of attention coefficients of a $k^{th}$ GAT layer |
| A(•) | A user embedding function |

FIG. 1 shows an example of a method of analyzing social influence between Internet forums according to embodiments.

Specifically, FIG. 1 shows an example of a method of training an artificial intelligence model used to analyze the social influence between the Internet forums according to the embodiments. The method of analyzing the social influence according to the embodiments may be performed by an apparatus of analyzing social influence (hereinafter referred to as an "analysis apparatus") according to embodiments.

The analysis apparatus according to the embodiments may train the artificial intelligence model for analyzing or generating social influence association information on the basis of various methods as described above. For example, the analysis apparatus receives posts expressed in the form of text data within a forum, analyzes the received posts and a connection relationship between the posts, and trains the artificial intelligence model that derives the social influence association information between the posts.

The method of analyzing the social influence according to the embodiments may include 1) an operation 100 of receiving posts containing text data within a forum, 2) an operation 101 of generating a forum interaction graph including a plurality of nodes corresponding to a plurality of embedded vectors generated by embedding the posts and edges indicating a connection relationship between the posts, and 3) an operation 102 of training an artificial intelligence model using the forum interaction graph.

In operation 100 in FIG. 1, the forum may be understood as a concept encompassing an Internet bulletin board or a similar community that is formed by a plurality of users accessing a specific website or server or the like.

In operation 100 in FIG. 1, the posts may be understood as content generated by the users in the forum or community for the purpose of communication in text or a similar form.

In operation 101 in FIG. 1, the forum interaction graph may be defined as follows.

For a given Internet forum F, a forum interaction graph GF=(V, E), which is a directed graph, is established, where V denotes a set of posts included in the forum F, and E may be a set of all pairs of interacting posts, that is, edges indicating a connection relationship between the posts.

In a forum interaction graph of an Internet forum, a post within the forum may be expressed and defined as a single node, and connection relationships (i.e., pairs of interactions) between posts may be expressed and defined as edges. Here, the "connection relationships between the posts" may be determined by various methods, and examples of the various methods will be described in detail with reference to FIG. 2.

In operation 102 in FIG. 1, the artificial intelligence model according to the embodiments may include at least one of a UAGAT according to embodiments, and a mirror network according to embodiments, which is a self-supervised attention-based network.

The artificial intelligence model of the analysis apparatus according to the embodiments may include a mirror network, which is a self-supervised learning model that uses graph attention in order to solve a problem associated with social influence. The mirror network according to the embodiments may optimize a graph attention network for a forum interaction graph given for learning social behaviors on an ego network. Here, influence ratios of neighbor nodes may be extracted from attention parameters of the artificial intelligence model.

For the mirror network according to the embodiments, the main idea is based on reproducibility of forum posts in a closed world assumption. That is, when a specific user performs a social behavior under a specific condition, it is assumed that he/she will perform the behavior when given the same situation and user. According to the above idea, the mirror network may be designed as a self-supervised regression model that outputs target posts based on previous forum posts, and the model may be optimized by minimizing an interval between the model output and the original post embedding. In the mirror network, an optimizable linear combination layer (so-called attention mechanism) may directly provide participation rates for predicting target nodes.

An example of a structure of the artificial intelligence model according to the embodiments will be described in detail with reference to FIG. 3.

The analysis apparatus according to the embodiments may transmit the artificial intelligence model learned based on the above-described method or one or more parameters (e.g., attention coefficients and the like) generated from the artificial intelligence model to other apparatuses (e.g., utilization apparatuses).

Meanwhile, the above-described social influence association information is information generated as a result of analyzing the posts within the forum, and may be information indicating the degree of influence that a specific post or a user of a specific post within the forum has on other posts or other users. For example, as a result of a first post being generated and published in the forum, when a second post with similar content to the first post is generated, it is highly likely that the second post was influenced by the first post. In addition, for example, when a first writer writes a specific post and publishes the specific post in the forum and then other writers generate and publish a plurality of posts with similar content to the above-described specific post, the first writer described above may be a writer with great social influence.

That is, the social influence referred to in this specification may be understood as the degree to which previous or other posts participate in or contribute to a process of generating a target post. The analysis apparatus according to the embodiments derives ratios of participation or contribution of other posts to the target post. The ratios of participation or contribution to each post may be defined or expressed as a weighted adjacency matrix as follows, and information about the ratios may be the social influence association information described above.

It is assumed that at is a target post for a given forum interaction graph GF. In order to generate social influence association information for all edges $(a_i, a_j) \in E$, that is, the target post $a_j$, it is necessary to derive the degree of contribution or participation of the post at. Formally, the social influence association information may be simply defined as SIA: $\{(a_i, a_j)\} \rightarrow^* [0, 1]$, which is a function having a real number value between 0 and 1, and this is because the social influence association information is a relative value to the target post and a total sum of the social influence association to the target post should always be 1 (i.e., $\Sigma_{j \in N(a_j)} \mathrm{SIA}(a_i, a_j)=1$ is satisfied). Therefore, the social influence association information may be defined again based on the following equation.

$$S = (SIA(a_i, a_j)) \in [0, 1]^{N,N} \quad \text{[Equation 1]}$$

That is, the social influence association information is a stochastic matrix, where $\mathrm{SIA}(a_i, a_j)$ denotes an $(i, j)^{th}$ entry, and N denotes the number of all nodes in $G_F$.

The analysis apparatus according to the embodiments may solve many issues, including finding posts that have influence in academia, industry, etc., disclosing influential people, or tracking spammers in Internet forums, by utilizing the above-described analysis.

Figure 2:
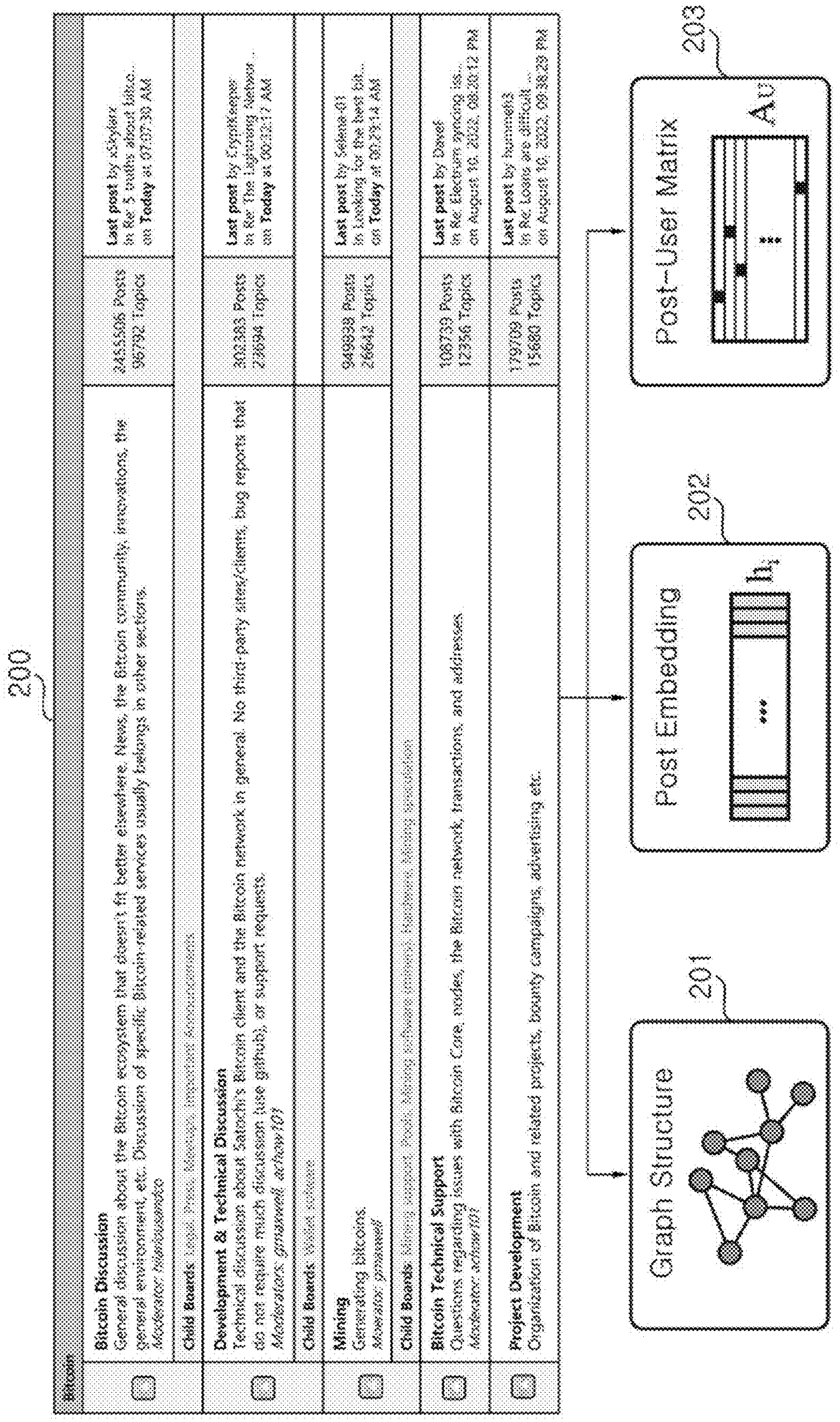
FIG. 2 shows an example of an operation in which an analysis apparatus according to embodiments obtains posts and performs pre-processing on the posts.

FIG. 2 shows an example of an operation in which an analysis apparatus according to embodiments obtains posts and performs pre-processing on the posts.

Specifically, FIG. 2 shows 1) an operation 200 of obtaining text data of posts within a forum, 2) an operation 201 of generating a forum interaction graph, 3) an operation 202 of embedding the text data, and 4) an operation 203 of generating a post-user matrix of the analysis apparatus according to the embodiments.

The analysis apparatus according to the embodiments may obtain the text data of the posts within the forum (200).

The analysis apparatus according to the embodiments may generate the forum interaction graph on the basis of the obtained posts and information indicating a connection relationship between the posts (201).

Before learning graph attention using posts, it is necessary to establish and analyze an influence path of social influence propagating from post to post. Before learning graph attention using posts, it is necessary to define the influence path of the social influence propagating between the posts. To this end, the analysis apparatus according to the embodiments may define influence connectivity between the existing post and a new post. When a post is made by a writer (user) of the post, two types of interactions may be considered. One is (i) an "implicit interaction" made by the user or writer who posts the post, and the other is (ii) an "explicit interaction" predefined on a platform of the forum.

"Implicit interaction" is used to mean that something is shared by a single user, and may be an interaction when the user remembers his/her last post and makes a new post within the context or situation of the forum. The "explicit interaction" may be an "explicit" connection predefined by the platform of the forum. For example, examples of the explicit interaction may include a reply on Twitter, a comment on Facebook, a direct quote on an Internet forum, and the like. In the analysis apparatus according to the embodiments, a "thread" interaction and a "quote" interaction may be regarded as explicit interactions. An edge is formed for each pair of successive posts in a thread and for each pair of quote posts with quote posts.

The analysis apparatus may generate a forum interaction graph according to embodiments by inserting a forum post V, making edges by a defined interaction E, and converting forum information into a graph structure.

The analysis apparatus according to the embodiments may perform the operation 202 of embedding the text data.

The analysis apparatus according to the embodiments may check the text data within the posts to generate a plurality of embedded vectors, which are results of embedding the text data. Here, the plurality of embedded vectors may be data in which the text data within the posts is embedded based on a BERT model. In addition, the plurality of embedded vectors may be data in which the text data within the posts is embedded based on term frequency-inverse document frequency (TF-IDF) values.

In other words, in a first operation of capturing the inter-relationships between posts, it may be necessary to convert the posts into a vector form for accessibility. The analysis apparatus according to the embodiments may embed the text data given in the posts in a vector form using a TF-IDF method, a method of using a supervised pre-training model, and a method of using a BERT model.

The analysis apparatus according to the embodiments may further perform the operation 203 of generating a post-user matrix $A_U$.

The post-user matrix according to the embodiments may be expressed as a sparse matrix of size (number of posts× number of users). For example, each element of the post-user matrix may indicate whether a specific user has written a specific post, and may be composed of 1 or 0.

The post-user matrix according to the embodiments may be used by a utilization apparatus that uses the artificial intelligence model according to the embodiments or the information (e.g., the attention coefficients and the like) extracted by the artificial intelligence model. For example, the utilization apparatus may find spammers or influencers in the forum using the post-user matrix.

The operation of the utilization apparatus that finds spammers or influencers in a forum using a post-user matrix will be described in detail with reference to FIG. 4.

Figure 3:
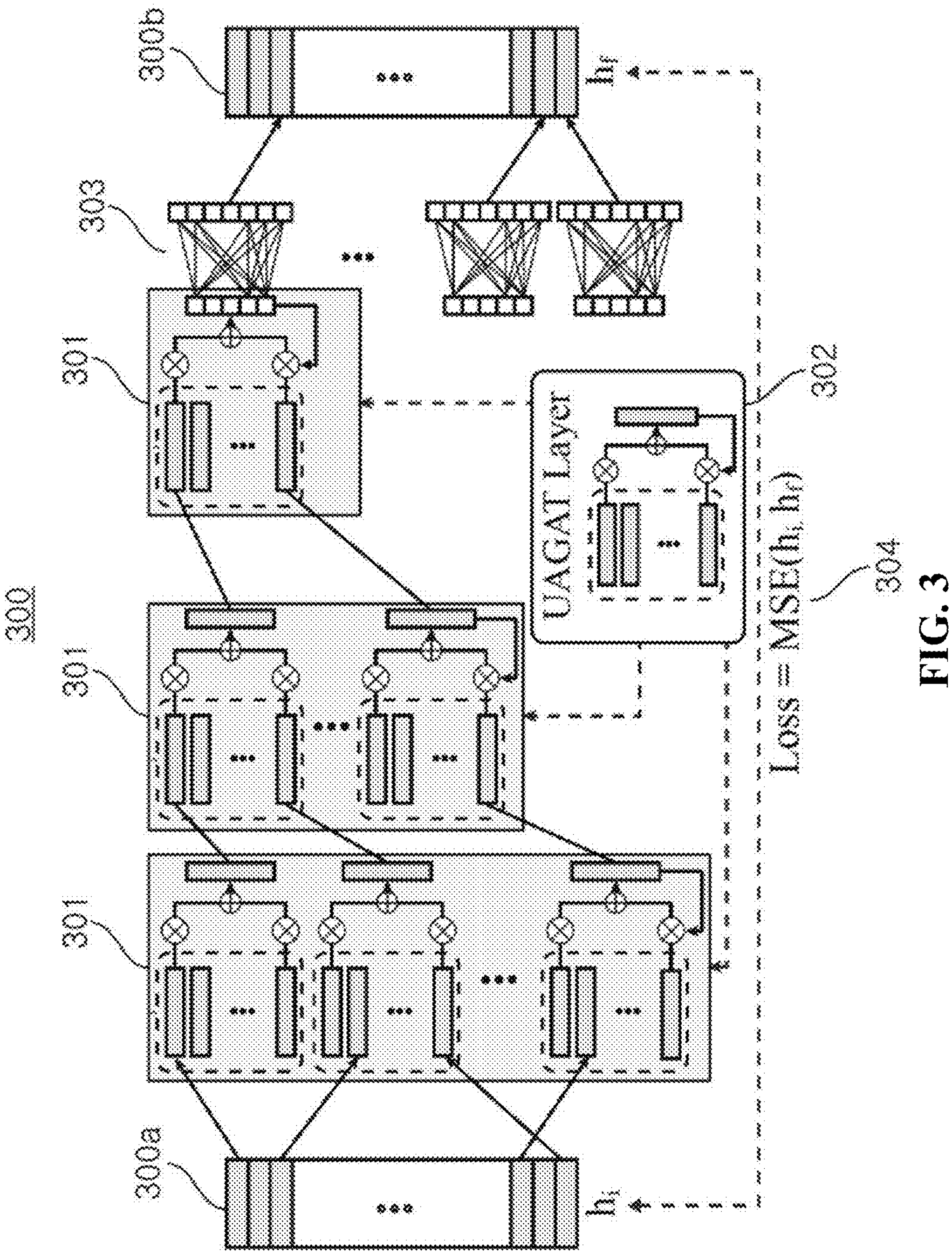
FIG. 3 shows an example of a configuration of an artificial intelligence model included in an analysis apparatus according to embodiments, and a training operation of the artificial intelligence model.

FIG. 3 shows an example of a configuration of an artificial intelligence model included in an analysis apparatus according to embodiments, and a training operation of the artificial intelligence model.

Specifically, FIG. 3 shows an example of a structure of an artificial intelligence model 300 included in the analysis apparatus according to the embodiments which learns using embedded text data and/or a forum interaction graph, and an operation of deriving/updating one or more attention coefficients.

Referring to FIG. 3, the artificial intelligence model 300 according to the embodiments may include a mirror network according to embodiments composed of one or more graph attention layers 301. Further, the artificial intelligence model 300 according to the embodiments may further include one or more decoding layers 303.

The graph attention layer 301 may include one or more graph attention networks (GAT) including attention coefficients. The artificial intelligence model 300 may update the attention coefficients as learning progresses. That is, the artificial intelligence model 300 may be learned to receive a first embedded vector 300*a* generated by embedding a first post corresponding to a first node and infer a second embedded vector 300*b* generated by embedding a second post corresponding to a second node adjacent to the first node, on the basis of a forward propagation operation. In this case, the artificial intelligence model 300 may calculate a loss function 304 derived by the first embedded vector 300*a* and the second embedded vector 300*b* and update the attention coefficients of the graph attention layer 301 in a way that minimizes the loss function, on the basis of a backward propagation operation.

Graph Attention Layer on Forum Interaction Graph

Meanwhile, the graph attention layer 301 may further include a UAGAT layer 302 including an attention coefficient. The user-aware graph attention network (hereinafter referred to as "UAGAT") layer may be a layer for performing a user-aware graph attention mechanism. A description of the UAGAT layer will be given below.

Specifically, in order to extract influence of neighbor nodes (which may be posts connected to a target post) on the target post, the artificial intelligence model 300 according to the embodiments may include the graph attention layer(s) 301. The analysis apparatus according to the embodiments may train the artificial intelligence model 300 using a graph attention mechanism in an optimizable linear combination, and as a result, the analysis apparatus may extract a ratio of the degree of participation or contribution (i.e., social influence association information) of neighboring nodes for the target post. Because of the unity of the interaction layer, the attention coefficient may be considered as an association ratio between the target post and the neighboring posts.

The graph attention layer 301 may be a layer in which neighboring embedded vectors (i.e., embedded vectors corresponding to neighboring nodes) are weighted and summed. Generally, embedded vectors $h_j$ of a post i that correspond to neighbor nodes are multiplied by an optimizable parameter W, and then become a component of a weighted sum to generate a target node $h'_i$, as shown in the following equation.

$$h'_i = \sigma\left(\sum_{j\in N_i} \alpha_{ij} W h_j\right) \quad \text{[Equation 2]}$$

Here, $N_i$ may be a set of neighbor nodes of the node i, and $\alpha_{ij}$ may be a coefficient composed of a linear combination of a post j to form the post i. In most cases, the GAT described above may have a multi-layer structure in which a plurality of layers are stacked in order to collect information from k-hop nodes as well as directly connected neighboring nodes.

The graph attention layer 301 according to the embodiments may receive the embedded vectors 300*a* and the forum interaction graph as inputs. $\alpha_{ij}$ is inherently optimizable in the process of training the artificial intelligence model, and may be expressed as follows.

$$\alpha_{ij} = \frac{\exp(LeakyReLU(a[(Wh_i \| Wh_j)]))}{\sum_{j' \in N_i} \exp(LeakyReLU(a[(Wh_i \| Wh'_j)]))} \qquad \text{[Equation 3]}$$

Here, a may be a shared optimizable parameter for linear weights of embedded vectors.

Meanwhile, the artificial intelligence model according to the embodiments may receive a specific embedded vector and learn inference to predict its own embedded vector. For example, the graph attention mechanism of the artificial intelligence model according to the embodiments may also perform a self-aggregation operation. In the original GAT model, $j \in N_i$ according to Equation 2 above may include the target node i itself, and this is because it is basically designed for a node classification task. However, the mirror network according to the embodiments includes a regression model created by removing additional self-circulation from a last graph attention layer of the mirror network that predicts original embedding information and a last embedded vector. When target vectors are accumulated, the mirror network may generate a final embedding result using an initial embedded vector while ignoring neighbor node information. Even in a multi-layer (or k-hop) setting, the embedding result of the target does not affect the final shape of the embedding. This is because the forum interaction graph is a circular and directed graph. Conversely, when the attention values $\alpha_{ij}$ are intended to be calculated, a self-embedded vector $h_i$ may be used as shown in Equation 4 below. Since even human analysts cannot predict influence of a post without information of a target node, this method is a natural way to calculate the influence together with the target node and neighboring node contexts.

The artificial intelligence model according to the embodiments may perform a graph attention mechanism for solving an order-invariance problem. Specifically, there are features that do not change in the original graph attention mechanism. Briefly speaking, when the order of the magnitude of the attention coefficients is set as $\alpha_{ij} > \alpha_{ik}$, the magnitude of the attention coefficients may be preserved for all i. This is because the attention coefficients are determined by one shared optimizable parameter a. In order to derive the attention coefficients as follows in Equation 4, one attention may be divided into an i part and a j part.

$$e_{ij} = a_1 Wh_i + a_2 Wh_j \qquad \text{[Equation 4]}$$

$$\alpha_{ij} = \frac{\exp(e_{ij})}{\sum_{j' \in N_i} \exp(e_{ij'})}$$

Here, $e_{ij}$ may be a component of one attention.

Therefore, when there is an order between $a_2 Wh_j$ and $a_2 Wh_k$, there will also be an order between $e_{ij}$ and $e_{ik}$. Since both exponential and LeakyReLU functions are monotonic functions, there is a problem in that the order of the magnitude of the attention coefficients is preserved even according to the entire attention mechanism.

In order to solve the above problem, Brody proposed GATv2, which attempted to change an operation location of a (see Equation 5 below).

$$e_{ij} = a \cdot LeakyReLU([(Wh_i \| Wh_j)]) \qquad \text{[Equation 5]}$$

The artificial intelligence model according to the embodiments may calculate one attention $e_{ij}$ to derive the attention coefficient on the basis of the above-described GATv2. However, the above-described method has a limitation in measuring social influence of a user who has written a post on other posts and other users, beyond a relationship between the posts. Therefore, the analysis apparatus or artificial intelligence model according to the embodiments may perform a user-aware graph attention mechanism, and may further generate a user embedding function A(·) for this purpose.

The artificial intelligence model according to the embodiments may include one or more UAGAT layers 302 in order to perform the above-described user-aware graph attention mechanism.

Specifically, the tendency to be influenced by individual posts is a characteristic that varies from user to user, but GATv2 does not obtain such user information in the process of calculating attention coefficients. Therefore, the artificial intelligence model according to the embodiments may perform the user-aware graph attention mechanism. Therefore, the artificial intelligence model according to the embodiments may calculate one attention $e_{ij}$ to derive the attention coefficient, on the basis of Equation 6 in which the optimizable parameter a is replaced with the optimizable parameter A(·) that can be optimized for each user, which is a user embedding function.

$$e_{ij} = A(u_i) \cdot LeakyReLU([(Wh_i \| Wh_j)]) \qquad \text{[Equation 6]}$$

Here, $u_i$ denotes a writer of an $i^{th}$ post. In order to capture overall and user-specific behavior, the artificial intelligence model according to the embodiments may use hybrid attention and/or user-aware attention for GATv2 to calculate one attention $e_{ij}$ to derive the attention coefficient, as shown in Equation 7 below.

$$e_{ij} = a \cdot A(u_i) \| LeakyReLU([(Wh_i \| Wh_j)]) \qquad \text{[Equation 7]}$$

Here, A(·) may be a user embedding connected to a node embedding, and a may be a parameter with two times as many dimensional sizes.

Self-Supervised Embedding Prediction (Training of Artificial Intelligence Models Using Graph Attention Layers—Forward Propagation and Backward Propagation, Etc.)

Thereafter, the artificial intelligence model or analysis apparatus according to the embodiments may perform a backward propagation operation on the layers (UAGAT layers and/or GAT layers, etc.) included in the artificial intelligence model using the output embedded vector 300*b* and the input embedded vector 300*a*. For example, the artificial intelligence model or the analysis apparatus may generate a loss function and perform a backward propagation operation on the basis of the generated loss function.

Specifically, at the very end of the mirror network, the artificial intelligence model may compare an output node representation (e.g., embedded vector or the like) with an input node representation. A next layer after performing the graph attention mechanism may be a decoding layer 303 that receives an output accumulated vector as input data. In order to meet the initial shape and dimension of the input first embedded vector, the decoding layer 303 may include twofold fully connected layers, and the twofold fully connected layers may be connected directly following the UAGAT layers 302 or GAT layers 301. Meanwhile, a loss function L according to embodiments may be calculated using a mean square error (MSE) function as shown in Equation 8 below.

$$L = MSE(h_f, h_i) \quad \text{[Equation 8]}$$

Here, $h_f$ and $h_i$ may be a final output of the mirror network and initial post embedding information generated by embedding functions (e.g., BERT and the like), respectively.

According to the embodiments, the input data of the artificial intelligence model should be within a mini-batch in the optimization process, and this is because a graph was generated using posts as nodes. At the Internet forum scale, scalability is important, and full-batch algorithms (e.g., the original graph convolutional network (GCN), GAT, etc.) may be difficult to use. Therefore, the mirror network according to the embodiments may adopt a GraphSAGE style mini-batch. The mini-batch may include selected nodes and their k-hop neighbors which can be reached by jumping k times, where k may denote a depth of the GNN layers, and the artificial intelligence model may calculate the loss function only for the selected nodes. One difference is that the above method excludes random sampling of neighbors. This is because the analysis apparatus learns influence between all possible pairs of forum posts, and all edges in a k-hop ego network are included in the mini-batch. In summary, the mirror network may be optimized together with the loss function by stochastic gradient decent.

Influence Extraction (Extraction of Social Influence Association Information According to Embodiments)

Based on the above-described method, the analysis apparatus or artificial intelligence model according to the embodiments may extract social influence information (value).

Specifically, after optimizing or learning is performed according to the above-described method, the analysis apparatus may extract attention coefficients of the graph attention layers (GAT, UAGAT, etc.). The attention coefficients may be accumulated in the form of a stochastic matrix. First, a first method in which social influence is extracted from the attention coefficients involves generating one matrix including social influence information of neighbor nodes from the extracted attention coefficients. Since the artificial intelligence model includes multi-layer graph attention layers, the attention matrices should be combined into one adjacent matrix. Therefore, social influence association (SIA) information (matrix) below may be a stochastic matrix calculated using Equations 9 and 10 below.

$$\mathcal{A}^k = \left(\alpha_{ij}^k\right) \in \mathbb{R}^{N(V_a)\times N(V_a)} \quad \text{[Equation 9]R}$$

$$A^k = \left(\alpha_{ij}^k\right) \in \mathbb{R}^{N(V_a)\times N(V_a)}$$

$$S = \prod_{k=1}^{K} A^k \quad \text{[Equation 10]}$$

Here, $A^k$ may be a result of the attention trained from GAT, and S may be social influence association information (matrix).

The analysis apparatus according to the embodiments may provide at least one of the artificial intelligence model (mirror network) trained based on the above-described method, the optimized attention coefficients, and the social influence association information (matrix) generated based on the attention coefficients to a utilization apparatus that provides one or more services Furthermore, the analysis apparatus according to the embodiments may provide various services using at least one of the artificial intelligence model (mirror network) trained based on the above-described method, the optimized attention coefficients, and the social influence association information (matrix) generated based on the attention coefficients.

In the present disclosure, these components may be included as examples, and thus it is possible to automatically and easily detect users who cause social issues (spammers) or users who can exert social influence (influencers) by quantitatively analyzing influence between posts and/or users.

In the present disclosure, these components may be included as examples, and thus it is possible to rapidly and accurately identify social issues that may arise within the forum.

In the present disclosure, these components may be included as examples, and thus it is possible to predict signs of cybercrime occurring within the forum or crime that may occur in the real world, thereby preparing for or preventing secondary social phenomena or damage.

Examples of various services will be described in detail with reference to FIG. 4 below.

Figure 4:
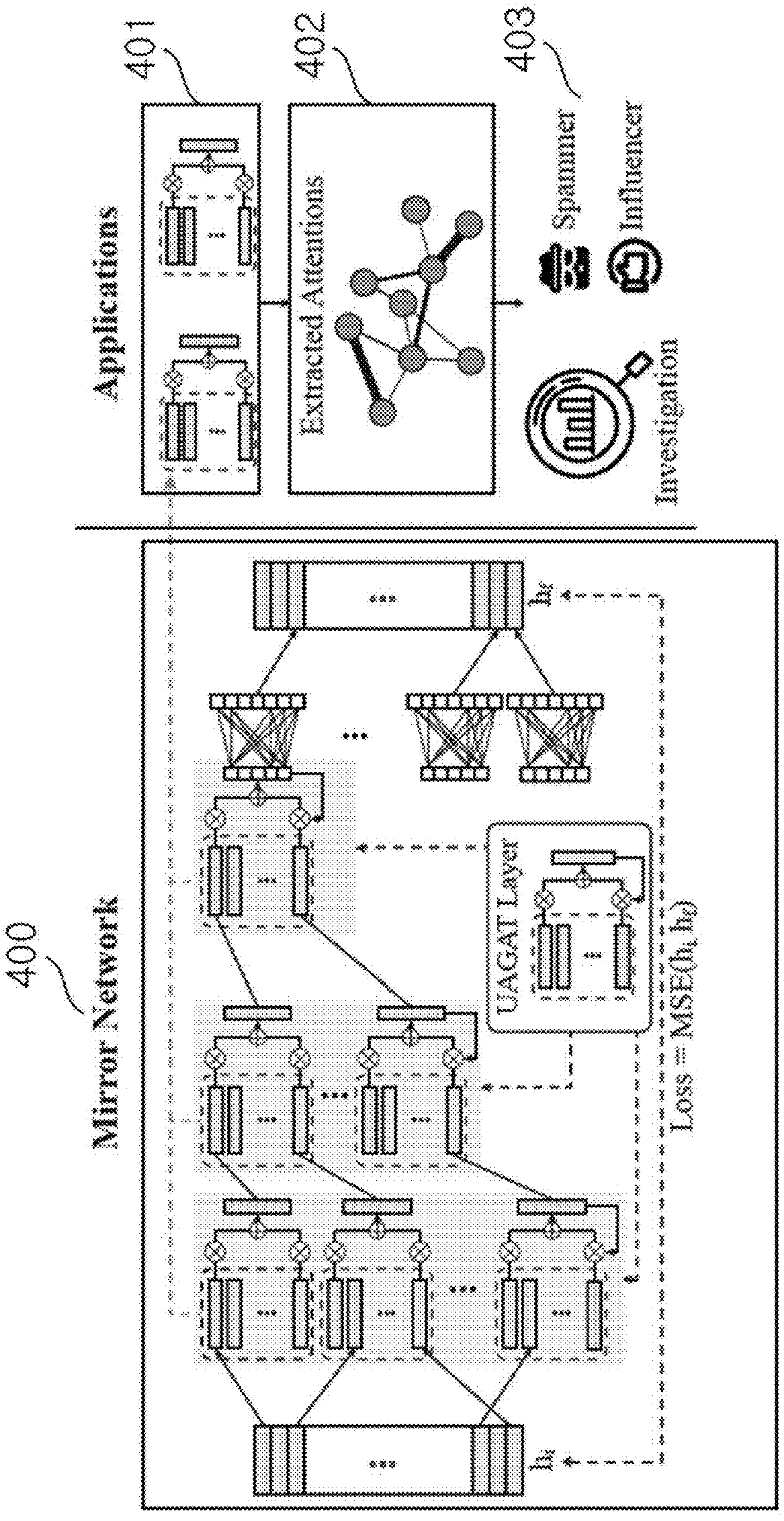
FIG. 4 shows an example of an operation in which an analysis apparatus or utilization apparatus according to embodiments provides related services using a trained artificial intelligence model.

FIG. 4 shows an example of an operation in which an analysis apparatus or utilization apparatus according to embodiments provides related services using a trained artificial intelligence model.

The analysis apparatus according to the embodiments may provide various services 403 using an artificial intelligence model 400 learned by the method described in FIGS. 1 to 3 or information (e.g., attention coefficients and/or social influence association information (matrix), etc.) 401 learned by the artificial intelligence model 400. Alternatively, the analysis apparatus according to the embodiments may provide the artificial intelligence model 400 learned by the method described in FIGS. 1 to 3 or the information 401 learned by the artificial intelligence model 400 to the utilization apparatus, and the utilization apparatus may provide the various services 403 using the artificial intelligence model 400 or the information 401.

Meanwhile, the various services 403 may be services 403 in which specific information is analyzed based on social influence association within a forum. For example, the analysis apparatus or the utilization apparatus may provide a spammer detection service 403 in which spammers who write posts that are unrelated to topics of the forum or to topics currently being discussed or of interest to many users (i.e., spam) are detected. Further, for example, when a specific user receives attention from many users whenever he/she posts a post or when many posts that are highly related to the posted post are posted, the analysis apparatus or the utilization apparatus may provide an influencer detection service 403 for detecting the specific user, that is, an influencer.

In order to provide the above-described spammer detection service 403 and/or influencer detection service 403, the analysis apparatus or utilization apparatus according to the embodiments may derive specific parameter(s) 401 from the attention coefficient(s) and/or social influence association information (matrix) derived in FIGS. 1 to 3.

For example, the analysis apparatus or utilization apparatus according to the embodiments may derive user-to-user influence information (matrix) u on the basis of the social influence association information (matrix). Here, u may be derived based on Equation 11 below.

$$\mathcal{U} = A_U^T S A_U \quad \text{[Equation 11]}$$

$$u = A_U^T S A_U$$

Here, $A_U$ may be referred to as a post-user matrix, and the post-user matrix may be expressed as a sparse matrix of size (number of posts×number of users). For example, each element of the post-user matrix may indicate whether a specific user has written a specific post, and may consist of 1 or 0.

Furthermore, in the process of deriving the user-to-user influence (matrix), the analysis apparatus or utilization apparatus according to the embodiments may propagate social influence association information (matrix) to the entire forum interaction graph using a random walk with restart (RWR) method, calculate influence information (score matrix) $S_{RWR}$ $S_{RWR}$, that is, extended attention 402, for each node in the entire forum interaction graph, and utilize the calculated influence information.

Specifically, as described in FIGS. 1 to 3, it may be impractical to quantitatively measure the effect of the social influence association information (matrix), and thus in the present disclosure, the above-described social influence association information (matrix) S provides two practical applications. In order to propagate the social influence association information (matrix) to the entire forum interaction graph, the analysis apparatus or utilization apparatus according to the embodiments may calculate influence information, that is, extended attention information 402, over the entire forum interaction graph using the random walk with restart (RWR) method. First, the analysis apparatus or the utilization apparatus may set an initial value of a target node to 1, repeatedly transmit an influence score to neighboring nodes according to a weight of social influence association information (matrix), and restart a random walk with a certain probability at the initial target node. Thereafter, since each node in the graph corresponds to a post in an Internet forum, the influence scores between all posts in the forum may be calculated based on the above-described algorithm, and a score matrix resulting from the calculation, that is, extended attention, may be notated as $S_{RWR}$ 402.

In order to assess influence between users, a post-to-post matrix $S_{RWR}$ 402 may be converted into a user-to-user influence matrix u which contains more coarse-grained information. The matrix u may be calculated based on Equation 11 described above. Here, $A_U$ may be referred to as a post-user matrix, and the post-user matrix may be expressed as a sparse matrix of size (number of posts×number of users). For example, each element of the post-user matrix may indicate whether a specific user has written a specific post, and may consist of 1 or 0.

Meanwhile, the matrix u represents values corresponding to the influence that a user exerts on those around him/her according to a direction of a flow of social influence by a position (i.e., the row and column of the element) of the element. The matrix u is the influence the user exerts on those around him/her according to the direction of the flow of social influence, and may include in-flow influence information, self-flow influence information, and out-flow influence information. The in-flow influence may be the influence that other users' previous posts (e.g., top posts) exert on the target user's post. Likewise, the out-flow influence may be the influence that the target user's post exert on other users' future posts (e.g., sub-posts). The self-flow influence may be the influence exchanged between the target user's posts.

The analysis apparatus or utilization apparatus according to the embodiments may provide the above-described spammer detection service 403 and/or influencer detection service 403 on the basis of the above-described user-to-user influence information (matrix) u.

First, the spammer detection service 403 will be described.

In order to detect spammers in the forum, the analysis apparatus or utilization apparatus according to the embodiments may generate one or more parameters using the user-to-user influence information (matrix) (hereinafter referred to as u), and detect spammers on the basis of the generated parameters.

For example, the analysis apparatus or utilization apparatus according to the embodiments may first derive TSI parameter for a post i on the basis of Equation 12 and/or a SI/P parameter for a post i on the basis of Equation 13.

$$TSI(i) = u_{(i,i)} * \sum_k A_{U(k,i)} / \sum_j u_{(i,j)} \quad \text{[Equation 12]}$$

$$SI/P(i) = u_{(i,i)} / \sum_k A_{U(k,i)} \quad \text{[Equation 13]}$$

Specifically, in the case of an Internet forum, there are users who post a large number of posts that are unrelated to the topic of the thread. These users are called spammers and their posts are called spam. Spammers are known to post everywhere, ignoring the context of the conversation. Due to the above characteristics, it can be inferred that spam posts are generally less influenced by different posts in the same thread and will have a greater self-flow influence due to repetitive operation (spam).

Accordingly, the analysis apparatus or utilization apparatus according to the embodiments may use the TSI parameter and/or the SI/P parameter according to Equation 12 and Equation 13 described above. The TSI parameter indicates the size of self-flow influence relative to the size of the average out-flow influence, and the SI/P parameter indicates the size of self-flow influence relative to the number of posts.

Therefore, the analysis apparatus or utilization apparatus according to the embodiments may detect spammers using methods such as checking the TSI parameter and the SI/P parameter that are above a specific reference value or a value within a specific reference value range.

Specifically, since the larger the value of the TSI parameter and/or SI/P parameter, the higher the probability that someone is a spammer, the analysis apparatus or utilization apparatus according to the embodiments may check whether the specific user is a spammer by comparing these parameters with a reference value or an optimized reference value.

Next, the influencer detection service 403 will be described.

In order to detect an influencer, the analysis apparatus or utilization apparatus according to the embodiments may calculate a total out-flow influence (TOI) parameter on the basis of Equation 14 below.

$$TOI(i) = \sum_{j \neq i} u_{(i,j)} \quad \text{[Equation 14]}$$

Specifically, considering that posts generated by an influencer or influencers may be first posts or first posters of a thread on a forum post, there may be no or little in-flow influence. Therefore, TOI may be composed of the total sum of in-flow influence.

The analysis apparatus or utilization apparatus according to the embodiments may detect users as influencers when the above-described TOI value is greater than or equal to a specific value, or at the top among TOI values when the TOI value is aggregated for each user.

Specifically, the social influence association information (matrix) may be advantageous for finding influential users or posts on a social network (or forum). Here, as described above, influencers may generally be people who gain fame and popularity online and potentially influence and guide other users in a community or social platform. Such a phenomenon may be often seen on various open social network platforms such as Twitter, TikTok, and Facebook, and may also occur in small online communities such as Internet forums.

In most cases, influential posts may have significantly different behavior from other posts. These influential posts have a large out-flow influence regardless of the in-flow influence. Given that the posts or users may be the first posts or posters of a thread on a forum post, there may generally be no or little in-flow influence. In addition, the influencers may also be detected by checking an absolute value of out-flow influence. Therefore, the analysis apparatus or utilization apparatus according to the embodiments may derive the TOI values of all users on the basis of Equation 14 described above to find the influencer, and as a result, may detect top users or users above a specific value as influencers.

In the present disclosure, these components may be included as examples, and thus it is possible to automatically and easily detect users who cause social issues (spammers) or users who can exert social influence (influencers) by quantitatively analyzing influence between posts and/or users.

In the present disclosure, these components may be included as examples, and thus it is possible to rapidly and accurately identify social issues that may arise within the forum.

In the present disclosure, these components may be included as examples, and thus it is possible to predict signs of cybercrime occurring within the forum or crime that may occur in the real world, thereby preparing for or preventing secondary social phenomena or damage.

Figure 5:
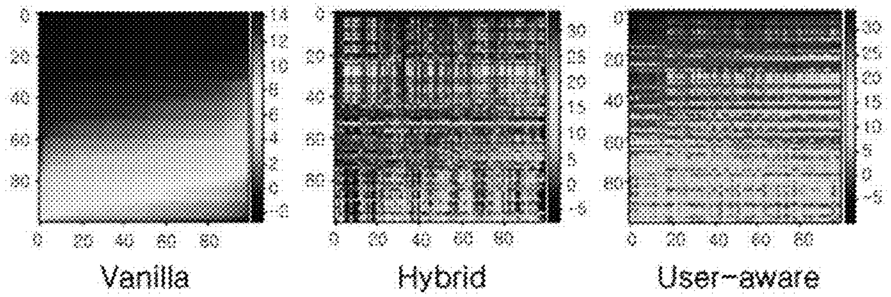
FIG. 5 shows data used for learning a mirror network of an analysis apparatus according to embodiments, and performance of the mirror network by number of layers.

FIG. 5 shows data used for learning a mirror network of an analysis apparatus according to embodiments, and performance of the mirror network by number of layers.

Specifically, A of FIG. 5 shows the numbers of posts, users, and links in forums (a dark web forum and a surface web forum) collected to train the mirror network of the analysis apparatus according to the embodiments.

In order to confirm the performance of the present disclosure, Internet forum data were collected from real-world underground forums (e.g., forums on the dark web, etc.) and public Internet forums (e.g., forums on the surface web).

First, the real-world underground forums will be described. Anonymous users discuss real-world crime on numerous forums. In order to simulate real analysis using social influence, in the present disclosure, underground forum data was collected through a Tor network, which is the best anonymous network. In the present disclosure, a forum called TheHub, which is the largest forum found on the Tor network, was selected as a target forum for experiment and a web page for crawling. TheHub is a forum for active discussions related to dark web markets and cryptocurrency. The main reason for selecting this forum is because of a large number of threads on the forum. Meanwhile, TheHub operates its own rules prohibiting discussion of crimes other than drugs, and thus it is assumed that website content has been safely collected without legal restrictions.

Public Internet forums will be described. In order to collect public open datasets, we generated a crawler for BitcoinTalk, which is the most active cryptocurrency forum on the surface web. The corresponding forum was first founded in 2009 by Satoshi Nakamoto, who first conceptualized Bitcoin. This community is a place to discuss Bitcoin, including general blockchain technology and other cryptocurrencies. BitcoinTalk's threads are categorized into numerous topics. With the vast number of posts and pages on the forum, we collected threads on Bitcoin topics that captured people's attention.

Next, experiment design to verify the performance of the present disclosure will be described.

The simplest way to evaluate the UAGAT and the mirror network according to the embodiments is to measure MSE loss. However, examining the self-supervised MSE loss cannot intrinsically answer the question of how good the model is, and thus may not be sufficient to evaluate the performance. Therefore, in order to provide transparent results, we measure the model's accuracy within a downstream classification task to identify whether the model is able to select the original embeddings over negative samples. In order to quantitatively demonstrate that the mirror network that uses the UAGAT layer was successfully optimized, we tested which original output and negative sample embeddings were closer to the model's output. The negative samples used in the experiment are randomly sampled 100 times from the same mini-batch of subjects. For the initial embedding and the negative samples distances from the model output are measured. When the output is closer to the initial embedding than the negative sample, we calculate a correctly positioned model output to be close to the original embedding. We then measure the binary accuracy of model classification (see Equation 15 and Equation 16).

$$Acc(i) = \frac{1}{N}\sum_{i} \text{Score } (i) \quad \text{[Equation 15]}$$

$$\text{Score } (i) = \begin{cases} 1, & \text{if } MSE(h_f^i, h_i^i) < MSE(h_f^i, h_i^i), \quad i \neq j \\ 0, & \text{otherwise} \end{cases} \quad \text{[Equation 16]}$$

The model was tested by varying different types (GCN, GAT, GATv2, UAGAT, and UA+v2) and depth (2-5) of graph interest. The details of the graph attention that was used are summarized as follows. GCN is not actually a graph attention model that aggregates by averaging the embeddings of neighboring nodes. GAT is a first graph neural network that uses attention techniques. This model calculates attention values and aggregates the embeddings of neighboring nodes. GATv2 is also a graph attention model that solves the order-invariance problem of GAT. The model calculates the attention value as described in Equation 4. UA+v2 is a hybrid layer of GATv2 and UAGAT and expresses global and user-wise operation. (Details are shown in FIGS. 3 and 4.)

After evaluating the performance of the model, the scores proposed in FIGS. 3 and 4 are calculated. In order to demonstrate the real-world application effect of underground forum research, the model having the best performance in TheHub data can by selected. Results obtained by using PageRank without influence weights are also explored for comparison. The resulting cases may be examined manually.

Next, the performance of the mirror network according to the present disclosure will be described.

It is possible to slightly improve the performance of the model using the attention mechanism according to the embodiments. Models using GCN layers do not reach attention-based models at all depths. The overwhelming accuracy may be due to the complexity of the initial post embedding we used. Language models (in particular, BERT in this setting) output large dimensional vectors as embedding, and thus, even with a deep graph model, the final embedding cannot be reached by simply averaging neighboring nodes. A vanilla GAT achieves slightly better accuracy (about 1% p) than GCN, but the performance thereof is significantly lower than other attention methods.

GATv2's better accuracy and two user-aware attention indicate the importance of order-invariance in social influence association problems. GATv2 obtains better scores than UAGAT. This suggests an advantage of global parameters over user-specific parameters. The highest observation is that a hybrid model (UA+v2) has the most compatible accuracy. The results may be associated with the synergy of shared parameters of GATv2 and user-specific parameters of UAGAT. Due to users not contributing much to the forum, UAGAT cannot capture the overall behavior of existing users, and conversely, GATv2 cannot interpret user-specific behavior.

For comparison at different depths, a 2-3 depth graph neural network layer model achieves the best accuracy. Such a trend seems consistent with recent research on semi-supervised learning settings. Empirically, we observed that overfitting occurs and accelerates as GNN layers become deeper, directly causing performance degradation of deep models.

C of FIG. 5 is a set of diagrams showing three types of attention information positioned prior to a softmax layer in a heat map in the mirror network of the analysis apparatus according to the embodiments.

C of FIG. 5 shows a heat map of attention values (prior to the softmax layer) calculated for 100 sampled posts. Since each row and column of the heat map represents a sampled node, elements in an $n^{th}$ row and an $m^{th}$ column represent attention values for users n to m. The rows are sorted according to the first user's interest value. In Vanilla in C of FIG. 5, it can be seen that attention values of all rows increase from top to bottom. That is, even when the attention values are in different columns, the attention values are in the same order of size. This means that the order of attention values is preserved regardless of the computing node, which accurately demonstrates the order-invariance problem of GAT. Unlike GAT, it shows that hybrid attention and user-aware attention, which is hybrid and user-aware in C of FIG. 5, do not preserve order. Instead, interest values are aggregated into random chunks and users vary their posts of interest by post.

Figure 8:
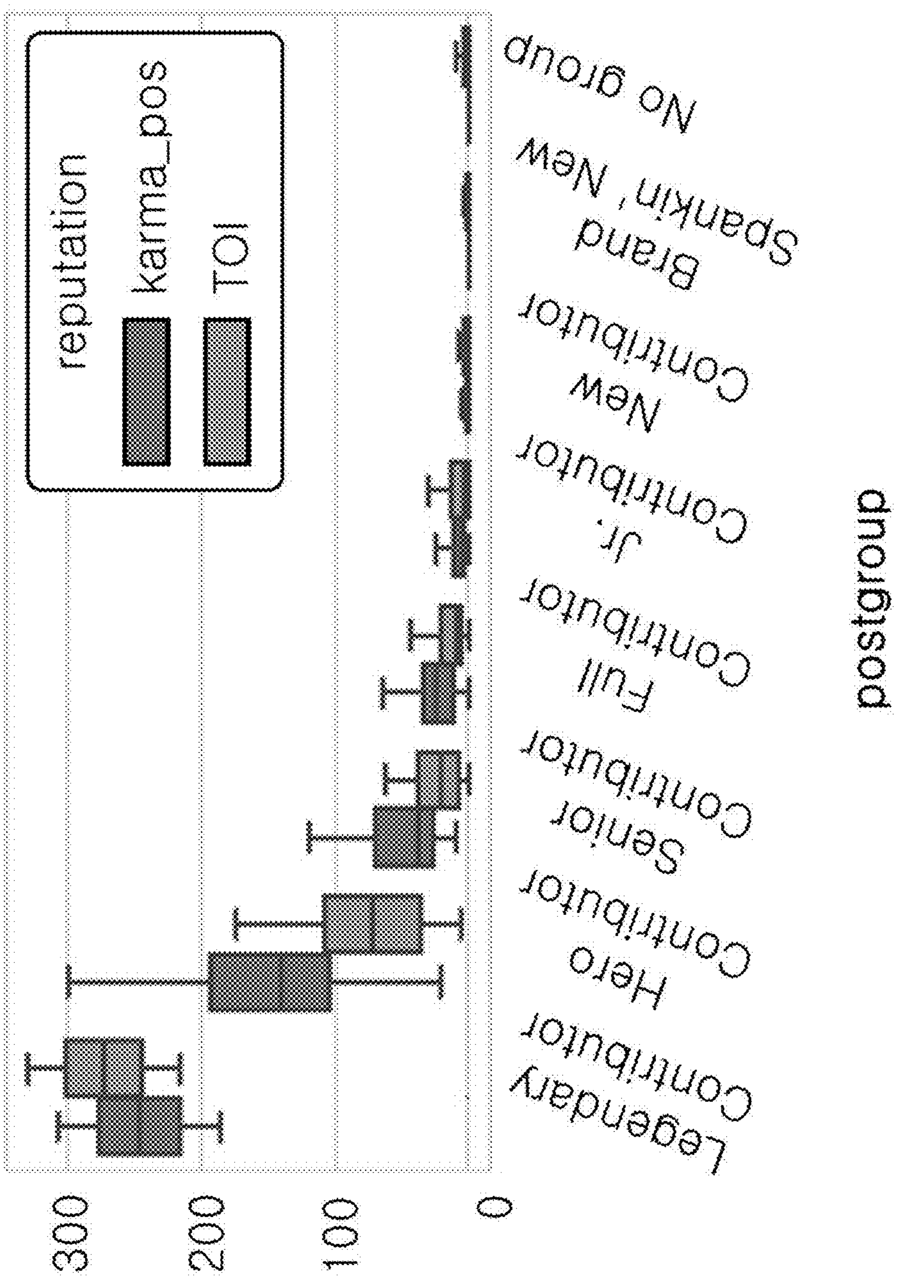

FIGS. 6 to 8 are diagrams showing results of identifying spammers and influencers using a trained artificial intelligence model, and performance thereof.

Specifically, FIG. 6 shows an example of results obtained when an analysis apparatus according to embodiments identifies spammers and influencers using a trained artificial intelligence model. Further, FIG. 7 shows an example of results obtained when an analysis apparatus according to embodiments determines spammers' posts and influencers' posts using a trained artificial intelligence model. Further, FIG. 8 shows statistics of two reputation values calculated for each postgroup.

The performance of spamming in Internet forums will be described. FIG. 6 shows top 10 users ranked by each score metric. The user with the highest TSI score is also the user with the highest SI/P score. This is mainly because the two spam scores are strongly associated. Despite the correlation of results and the similarity of the equations, the two scores represent different behavior of spammers. Users #259 and #573 are good examples that reflect this fact.

User #259, who has a top 10 SI/P score and a mediocre TSI score, repeatedly posted similar posts (see A of FIG. 7) in four different threads. After reviewing the posts, we discovered that user #259 had written simple and repetitive advertisements for drug dealing. These posts contain Uniform Resource Locators (URLs) that redirect to drug market hidden services via the Tor network, and the user posts such articles multiple times with only minor modifications. Therefore, it can be seen that there is slight leakage impact on posts in the same thread. It was found that 14.9% of influence was directed to other users' posts. Most posts, regardless of authenticity, reviewed user #259's service. Further, the impact began with a review message in response to user #259's thank you note.

User #573, who has the highest SI/P and TSI scores, was identified as the most aggressive spammer in the forum. This user is also a drug dealer who posted 160 advertisements in six different threads. This indicates aggressive spam in each thread. This behavior results in extremely high self-influence rates (even over 90%). The user may be regarded as a spammer. Previously, user #259 had a high SI/P score, but now has a low TSI score because he/she posted out of context. However, it can be inferred that since user #573 has significant values in both scores, high scores on both indicators indicate extreme spamming behavior. In the present disclosure, it is concluded that the TSI score alone is insufficient to distinguish between spammers and influencers, but the combination of SI/P and TSI scores effectively helps researchers analyze spammers.

Influencers in Internet forums will be described. User #221 with the highest TOI score may be an example of an influencer. As can be seen in FIG. 7A, the user seems to be a reviewer of a famous pharmaceutical store. Users #221 and #573, who are spammers, show completely different behavior despite their high TOI scores. Unlike user #573, user #221 did not write posts unrelated to the topic of the thread or send spam emails one after another without communication. The user's legitimacy is also shown in the user profile (see B of FIG. 7), where Karma is a reputation score used in various online forums, including TheHub. The two users have contrasting reputations, both in terms of forum karma points and their self-flow influence ratios. The self-flow influence ratio of user #221 is 17%, which is significantly lower than the self-flow influence ratio of 80% or more of the spammer. Such a difference between the ratios occurs due to active communication of user #221 with other users and many citations based on user reputation.

In order to check the TOI score, a method of comparing the TOI score with the karma score, which is a forum-specific reputation measure, may be used. Other users may obtain the karma score of the user. The karma score is a cumulative measure of other people's evaluations of the user. Helpful users collect high positive karma points, while inactive users may receive more moderate scores. FIG. 8 shows results of the reputation measure. The TOI scores of each postgroup specified in a user profile are sorted in the same order using positive karma values. The higher the reputation of the postgroup, the higher the TOI score and karma value, indicating that TOI is a good indicator of social influence. Further, a result of a postgroup "Hero Contributor" shows that TOI may be a measure much better than the karma points. The karma points are widely distributed. However, TOI shows that the scores of the respective postgroups are separated well into a narrow distribution. This difference is because the karma values only reflect points contributed by other users, while TOI considers the entire social context of the forum.

In summary, in some respects, the measure of the social influence shows better results than the karma points in identifying influencers.

The comparison with PageRank will be described. In order to highlight an effect of SIA analysis, a standard PageRank algorithm is applied without influence weights and a result of the application is compared with an influence factor score. PageRank was unable to identify influencers in the forum, and the top 10 users are almost identical to the top 10 users with the highest number of posts. PageRank relies only on a graph structure, and the graph structure of Internet forums is more arbitrary than that of other social network services that directly provide a friend making system. Therefore, PageRank outputs substantially the same result as the number of posts, which is the degree of the node in the forum graph. Meanwhile, since TOI scores may capture textual information of posts and participation in new posts on the basis of social influence association, the TOI scores are conceptually consistent with intuitions about social influence. This can prove that social influence association can be an important clue in tracking influencer's behavior.

Further, the measured influence flows help us understand how spammers and influencers interact with threads, which demonstrates the understandability advantage of our method. Compared to PageRank's static scores, detailed influence association primarily helps follow conversation flows to improve understanding of user behavior. It is emphasized that our method is an example of a method of providing an explanation of social phenomena, rather than a method of detecting a specific entity.

Furthermore, other studies related to this study will now be introduced.

The academic basis of this study is largely divided into two parts: social influence analysis and graph attention networks.

The social influence analysis will be described. Existing tasks on social influence may be further divided into two broad categories: informational social influence and user-level social influence.

In the informational social influence, people mainly focus on modeling the diffusion properties of information such as specific topics, news, etc. In order to analyze and explain influence propagation in the early stages of studies, SPIKEM is proposed. Thereafter, in order to efficiently model and predict propagation properties, DeepCas and VaCas which utilize deep learning-based approaches are proposed. In addition to the propagation properties, some tasks focus on various aspects such as sources outside the network and specific influence types.

Further, in the user-level influence analysis, some studies aim to measure the influence of individual users in social networks. Likewise, the influence and attributes of specific groups formed in social networks are also studied. Further, in several studies, user-level influence has been utilized in recommendation systems.

Neural networks and attention methods are displayed graphically. Recently, a GNN has achieved significant performance improvements for problems with graph structured data. The first demonstration of the graph neural network was a GCN, which generates a normalized aggregate function for a node from its neighbors in the graph. Graph-SAGE is an advanced artificial intelligence model of the GCN. GCN's neighbor aggregation extends using random walk sampling of k-hop neighbors. Like GraphSAGE, GAT utilizes attention techniques to collect neighbor information with weighted importance.

In several tasks, we are trying to make graph neural networks more efficient. Since the original graph neural network only considers homogeneous graphs, HetGNN and HAN connect GNN to heterogeneous graphs to process more complex data sets. In the context of efficacy, PPRGo and FastGCN propose a neighbor search method to solve neighborhood expansion in GNN. TinyGNN introduces a knowledge distillation strategy into graph neural networks to increase the node representation inference speed.

Figure 9:
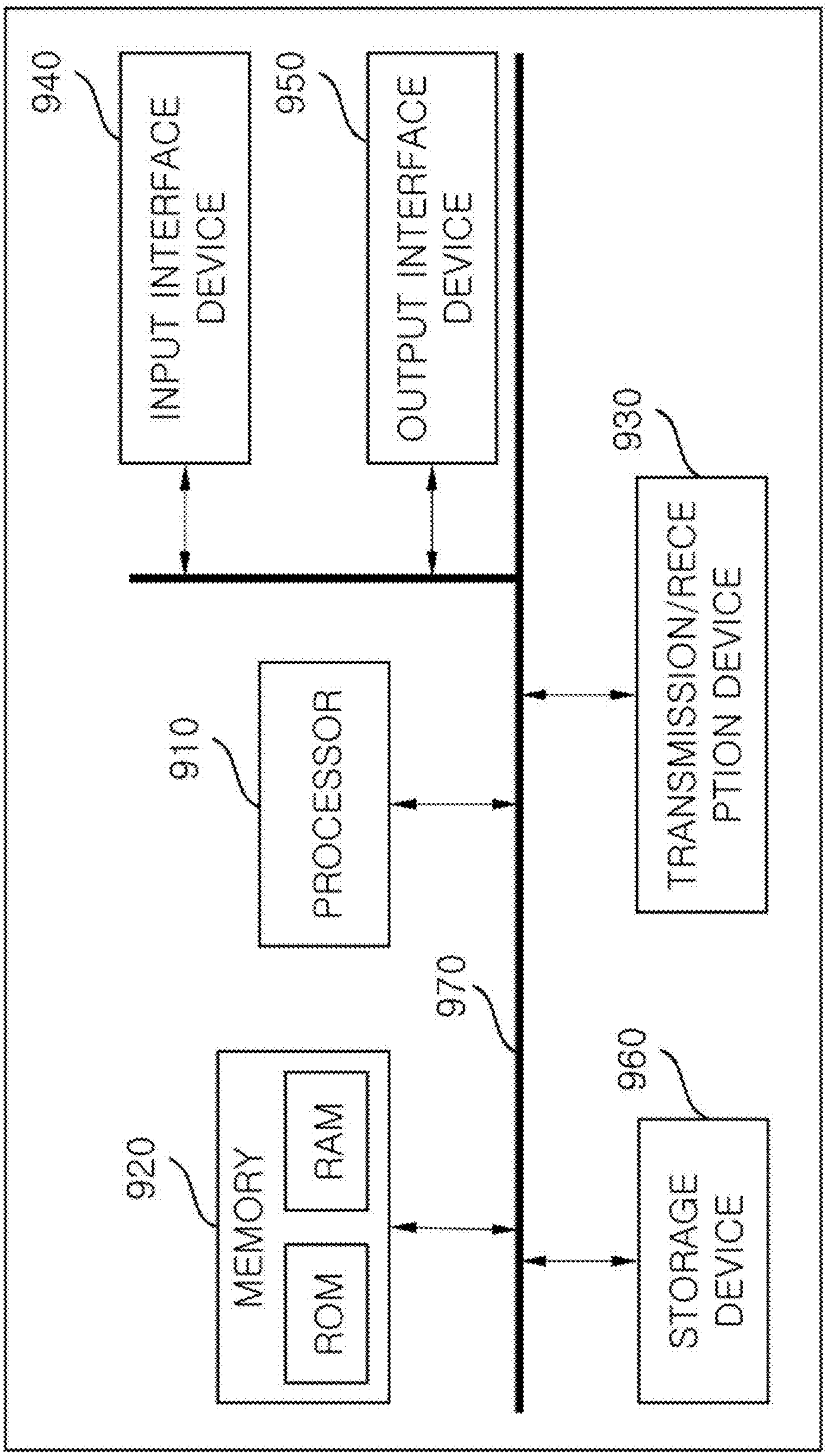
FIG. 9 is an example of a configuration diagram of an analysis apparatus that performs a method of analyzing social influence between Internet forums according to embodiments.

FIG. 9 is an example of a configuration diagram of an analysis apparatus that performs a method of analyzing social influence between Internet forums according to embodiments.

A server 900 for analyzing social influence between Internet forums according to the embodiments may include at least one of a processor 910, a memory 920, a transmission/reception device (or transceiver) 930, an input interface device 940, an output interface device 950, a storage device 960, and/or a bus 970.

The server 900 for analyzing social influence between Internet forums according to the embodiments may include, for example, one or more processors 910, and a memory 920 configured to store instructions that instruct the one or more processors to perform one or more operations.

Here, the one or more operations may include obtaining posts containing text data in a forum, generating a forum interaction graph including a plurality of nodes corresponding to a plurality of embedded vectors generated by embedding the posts and edges indicating a connection relationship between the posts, and/or training an artificial intelligence model using the forum interaction graph. Here, the artificial intelligence model according to the embodiments may include a graph neural network model that inputs a first embedded vector generated by embedding a first post corresponding to a first node to predict a second embedded vector generated by embedding a second post corresponding to a second node connected to the first node through an edge.

The plurality of embedded vectors according to the embodiments may be data in which the text data within the posts is embedded based on a BERT model. Further, the plurality of embedded vectors according to the embodiments may be data in which the text data within the posts is embedded based on TF-IDF values.

Furthermore, in the training of the artificial intelligence model according to the embodiments, one or more attention coefficients may be updated based on the first embedded vector and the second embedded vector.

Furthermore, the artificial intelligence model according to the embodiments may include one or more layers including the one or more attention coefficients, and in the training of the artificial intelligence model, the one or more attention coefficients may be updated by receiving the first embedded vector to perform forward propagation on the first embedded vector, and performing backward propagation using the second embedded vector and a result derived from the forward propagation.

Further, the server according to the embodiments may further include identifying a spammer or an influencer from among writers of the posts on the basis of the trained artificial intelligence model. Here, in the identifying of the spammer or the influencer, the spammer or the influencer may be identified using user-to-user influence information that is calculated based on a first matrix (e.g., $A_U$ described above) representing the posts and user information of each post and a second matrix (e.g., S described above) derived based on the one or more attention coefficients. Here, the second matrix according to the embodiments may be generated by propagating the one or more attention coefficients to the forum interaction graph using a random walk with restart method.

The spammer identified by the analysis apparatus and/or utilization apparatus according to the embodiments may be derived based on one or more self-flow influence values indicating influence between the posts written by each writer from among values included in the user-to-user influence information. Further, the influencer identified by the analysis apparatus and/or utilization apparatus according to the embodiments may be derived based on at least one out-flow influence value indicating influence of one or more posts written after a first writer's post among the values included in the user-to-user influence information.

The methods according to the embodiments of the present disclosure may be implemented in the form of program instructions that can be executed through various computer units and recorded on computer readable media. The computer readable media may include program instructions, data files, data structures, or combinations thereof. The program instructions recorded on the computer readable media may be specially designed and prepared for the embodiments of the present disclosure or may be available well-known instructions for those skilled in the field of computer software.

Examples of the computer readable media include hardware devices that are specially made to store and perform the program instructions, such as a read-only memory (ROM), a random access memory (RAM), a flash memory, and the like. Examples of the program instruction include machine code generated by a compiler and high-level language code that can be executed in a computer using an interpreter and the like. The hardware device may be configured as at least one software module in order to perform operations of the embodiments of the present disclosure and vice versa.

Further, the above-described methods or apparatuses may be implemented by combining some or all of their components or functions or may be implemented separately.

The analysis apparatus according to the embodiments can solve many issues, including finding posts that have influence in academia, industry, etc., disclosing influential people, or tracking spammers in Internet forums, by utilizing the above-described analysis.

In the present disclosure, these components may be included as examples, and thus it is possible to automatically and easily detect users who cause social issues (spammers) or users who can exert social influence (influencers) by quantitatively analyzing influence between posts and/or users.

In the present disclosure, these components may be included as examples, and thus it is possible to rapidly and accurately identify social issues that may arise within the forum.

In the present disclosure, these components may be included as examples, and thus it is possible to predict signs of cybercrime occurring within the forum or crime that may occur in the real world, thereby preparing for or preventing secondary social phenomena or damage.

While the present disclosure has been described with reference to exemplary embodiments, it will be understood by those skilled in the art that various changes and modifications may be made without departing from the spirit and scope of the present disclosure as defined by the following claims.

What is claimed is:

1. A method of analyzing social influence, comprising:
- obtaining posts containing text data in a forum;
- generating a forum interaction graph including a plurality of nodes corresponding to a plurality of embedded vectors generated by embedding the posts and edges indicating a connection relationship between the posts; and
- training an artificial intelligence model using the forum interaction graph,
- wherein the artificial intelligence model includes a graph neural network model that inputs a first embedded vector generated by embedding a first post corresponding to a first node to predict a second embedded vector generated by embedding a second post corresponding to a second node connected to the first node through an edge.

2. The method of claim 1, wherein the plurality of embedded vectors are data in which the text data within the posts is embedded based on a model, Bidirectional Encoder Representations from Transformers (BERT).

3. The method of claim 1, wherein the plurality of embedded vectors are data in which the text data within the posts is embedded based on term frequency-inverse document frequency (TF-IDF) values.

4. The method of claim 1, wherein, in the training of the artificial intelligence model, one or more attention coefficients are updated based on the first embedded vector and the second embedded vector.

5. The method of claim 4, wherein the artificial intelligence model includes one or more layers including the one or more attention coefficients, and in the training of the artificial intelligence model, the one or more attention coefficients are updated by receiving the first embedded vector to perform forward propagation on the first embedded vector, and performing backward propagation using the second embedded vector and a result derived from the forward propagation.

6. The method of claim 4, further comprising identifying a spammer or an influencer from among writers of the posts on the basis of the trained artificial intelligence model.

7. The method of claim 6, wherein, in the identifying of the spammer or the influencer, the spammer or the influencer is identified using user-to-user influence information that is calculated based on a first matrix representing the posts and user information of each post and a second matrix derived based on the one or more attention coefficients.

8. The method of claim 7, wherein the second matrix is generated by propagating the one or more attention coefficients to the forum interaction graph using a random walk with restart method.

9. The method of claim 7, wherein the spammer is derived based on one or more self-flow influence values indicating influence between the posts written by each writer from among values included in the user-to-user influence information.

10. The method of claim 7, wherein the influencer is derived based on one or more out-flow influence values indicating influence of one or more posts written after a first writer's post among the values included in the user-to-user influence information.

11. A server for analyzing social influence, comprising:

one or more processors; and a memory configured to store instructions that instruct the one or more processor to perform one or more operations, wherein the one or more operations include:

obtaining posts containing text data in a forum, generating a forum interaction graph including a plurality of nodes corresponding to a plurality of embedded vectors generated by embedding the posts and edges indicating a connection relationship between the posts, and training an artificial intelligence model using the forum interaction graph, wherein the artificial intelligence model includes a graph neural network model that inputs a first embedded vector generated by embedding a first post corresponding to a first node to predict a second embedded vector generated by embedding a second post corresponding to a second node connected to the first node through an edge.

* * * * *